(12) United States Patent
Steinhardt

(10) Patent No.: US 10,628,707 B2
(45) Date of Patent: Apr. 21, 2020

(54) TIME-CORRECTED SENSOR SYSTEM

(75) Inventor: Nico Steinhardt, Frankfurt (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 696 days.

(21) Appl. No.: 14/343,998

(22) PCT Filed: Sep. 12, 2012

(86) PCT No.: PCT/EP2012/067873
§ 371 (c)(1),
(2), (4) Date: May 23, 2014

(87) PCT Pub. No.: WO2013/037850
PCT Pub. Date: Mar. 21, 2013

(65) Prior Publication Data
US 2014/0320310 A1    Oct. 30, 2014

(30) Foreign Application Priority Data

Sep. 12, 2011 (DE) .......... 10 2011 082 534
Sep. 12, 2011 (DE) .......... 10 2011 082 535
Sep. 12, 2011 (DE) .......... 10 2011 082 539
Sep. 12, 2011 (DE) .......... 10 2011 082 548
Sep. 12, 2011 (DE) .......... 10 2011 082 549
(Continued)

(51) Int. Cl.
*G06K 9/62* (2006.01)
*G01S 19/47* (2010.01)
(Continued)

(52) U.S. Cl.
CPC .......... *G06K 9/624* (2013.01); *B60R 16/0231* (2013.01); *G01C 21/165* (2013.01);
(Continued)

(58) Field of Classification Search
None
See application file for complete search history.

(56) References Cited

U.S. PATENT DOCUMENTS 5,928,309 A   7/1999 Korver et al.
6,240,367 B1  5/2001 Lin
(Continued)

FOREIGN PATENT DOCUMENTS

DE    10 2008 002576 A1    12/2009
DE    10 2010 063 984 A1    8/2011
EP     1 845 003 A2         10/2007

OTHER PUBLICATIONS

German Search Report dated Jan. 29, 2013.
International Search Report.

*Primary Examiner* — Curtis A Kuntz
*Assistant Examiner* — Shawna M Kingston
(74) *Attorney, Agent, or Firm* — Dickinson Wright PLLC

(57) ABSTRACT

A sensor system has a plurality of sensor elements and a signal processing device in communication with the plurality of sensor elements. The signal processing device is configured to evaluate more than one of at a substantially similar time and assign time information which includes information on the time of the respective measurement to the measurement data of physical variables, wherein the signal processing device takes into consideration time information at least during the generation of a fusion data set in a fusion filter.

9 Claims, 1 Drawing Sheet

(30) Foreign Application Priority Data

| | | | |
|---|---|---|---|
| Sep. 12, 2011 | (DE) | .......................... | 10 2011 082 551 |
| Sep. 12, 2011 | (DE) | .......................... | 10 2011 082 552 |
| Nov. 21, 2011 | (DE) | .......................... | 10 2011 086 710 |
| May 2, 2012 | (DE) | .......................... | 10 2012 207 297 |

(51) Int. Cl.
    *G01C 21/16*      (2006.01)
    *G08C 19/24*      (2006.01)
    *B60R 16/023*     (2006.01)
    *G06K 9/00*       (2006.01)

(52) U.S. Cl.
    CPC .......... *G01S 19/47* (2013.01); *G06K 9/00503* (2013.01); *G08C 19/24* (2013.01); *B60T 2210/36* (2013.01); *B60T 2250/06* (2013.01)

(56) References Cited

U.S. PATENT DOCUMENTS

| | | |
|---|---|---|
| 6,246,960 B1 | 6/2001 | Lin |
| 2003/0009282 A1 | 1/2003 | Upadhyaya et al. |
| 2004/0073360 A1* | 4/2004 | Foxlin .................... G01C 21/16 701/517 |
| 2009/0222204 A1 | 9/2009 | Roberts et al. |
| 2010/0114416 A1 | 5/2010 | Au et al. |
| 2010/0217542 A1 | 8/2010 | Fujita |
| 2011/0153266 A1 | 6/2011 | Shankwitz et al. |

\* cited by examiner

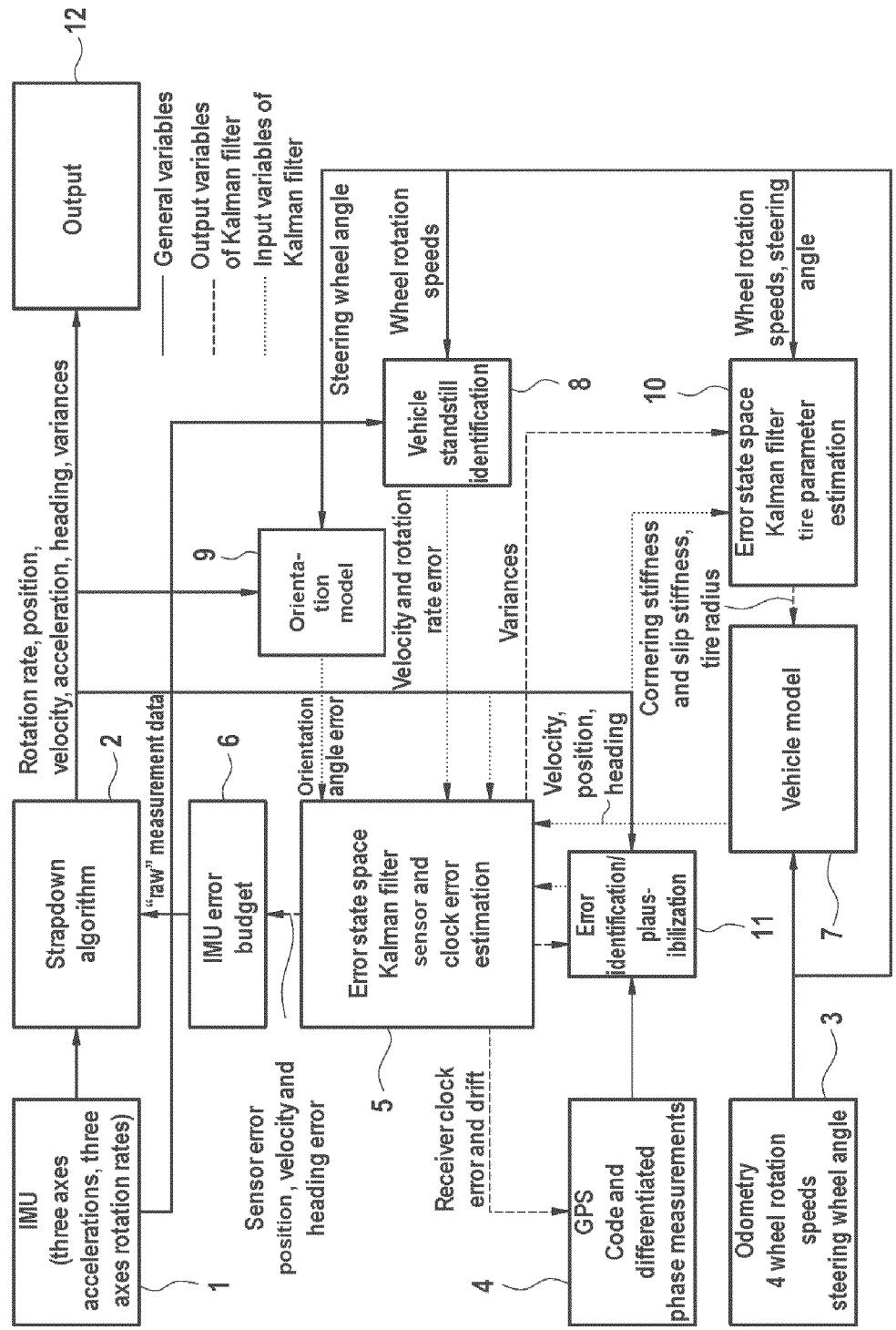

TIME-CORRECTED SENSOR SYSTEM

CROSS REFERENCE TO RELATED APPLICATIONS

This application claims priority to German Patent Application Nos. 10 2011 082 534.7, filed Sep. 12, 2011; 10 2011 082 535.5, filed Sep. 12, 2011; 10 2011 082 539.8, filed Sep. 12, 2011; 10 2011 082 548.7, filed Sep. 12, 2011; 10 2011 082 549.5, filed Sep. 12, 2011; 10 2011 082 551.7, filed Sep. 12, 2011; 10 2011 082 552.5, filed Sep. 12, 2011; 10 2011 086 710.4, filed Nov. 21, 2011; 10 2012 207 297.7, filed May 2, 2012; and PCT/EP2012/067873, filed Sep. 12, 2012.

FIELD OF THE INVENTION

The invention relates to a sensor system generally found in automobiles.

BACKGROUND

Laid-open specification DE 10 2010 063 984 A1 describes a sensor system, comprising a plurality of sensor elements and a signal processing device, wherein the signal processing device is configured in such a way that the output signals from the sensor elements are evaluated jointly.

The invention is based on the object of proposing a sensor system which enables a relatively high level of accuracy with respect to the evaluation and/or processing of the output signals and/or data from sensor elements.

The sensor elements may be designed in such a way that they detect at least partially different primary measured variables and use at least partially different measurement principles.

Expediently, the sensor system is arranged in a vehicle, in particular a motor vehicle, particularly preferably an automobile.

The fusion filter may be designed in such a way that function steps are implemented successively, each function step being assigned time information, wherein, in the function steps, in each case data/values with respect to physical variables are processed and, at defined times, fusion data sets are provided which each provide a relative value of the physical variable and information on the data quality in respect of each physical variable which is processed and/or calculated by the fusion filter.

the fusion filter, at least with respect to one of the physical variables, has, internally, an absolute value and/or internal value of this physical variable, wherein the absolute values and/or internal values of the preceding function steps with respect to one or more physical variables are stored and kept ready for a defined time span.

It is expedient for, depending on the time information of the input values, a physical variable, of the fusion filter, these input values to be computed in the fusion filter by virtue of being compared and/or computed with the absolute value and/or internal value of the same physical variable, the time information of which, i.e. the time information of the absolute value and/or the internal value, substantially corresponds to the time information of the input value.

The absolute value and/or internal value of the same physical variable with which the input value is compared and/or computed from the two temporally next, with regard to the time information, absolute values and/or internal values which are stored and kept ready, with this in particular being the absolute value and/or internal value to be interpolated with time information which is slightly more recent and the absolute value and/or internal value with time information which is slightly older than the time information of the assigned input value.

It is expedient for time information to be assigned to each of the input values of the fusion filter, as a result of which these input values of physical variables each have a priority, wherein, as part of the pending function step, the input values of physical variables of the fusion filter are computed with internal values of the fusion filter of the same physical variables, which correspond in terms of priority and/or with regard to the time information substantially to the respective time information and/or the priority of the respective input variable.

The signal processing device is designed in such a way that the priority of the presently pending function step is defined by the time information of the input value of a physical variable with the most recent time information, wherein the input values of physical variables whose time information is older are extrapolated onto the priority of the most recent time information and then computed with internal values of the fusion filter.

The signal processing device to be designed in such a way that the defined time span in which data/information/values are stored and kept ready is defined by the maximum delay of the input data of the fusion filter, which are determined from the maximum difference between the time information of the measurement of a physical variable and the time information of a presently pending function step of the fusion filter, wherein the maximum delay is in particular defined as being greater than or equal to the maximum expected delay of a measurement of a satellite navigation system which is part of the sensor system.

It is expedient for the signal processing device to be designed in such a way that the defined time span in which data/information/values are stored and kept ready is defined by a defined time span which is different for some or each physical variable.

The sensor system comprises a satellite navigation system, which provides a synchronization pulse and/or a synchronization method, with which the time information of the fusion filter is synchronized with the time information of the satellite navigation system.

It is expedient for the satellite navigation system to provide distance data in each case between the assigned satellite and the vehicle or a variable which is dependent thereon and velocity information data in each case between the assigned satellite and the vehicle or a variable dependent thereon, which distance data and velocity information data are transmitted as input values to the fusion filter, wherein these input values of physical variables of the satellite navigation system are computed, in time-corrected fashion, with internal values of the fusion filter by virtue of, depending on the time information of the input values, the internal values of these physical variables being extrapolated if the time information of the input values of these physical variables are older than time information of the presently pending function step of the fusion filter, wherein, for the extrapolation, in particular a gradient of the last two values of such a physical variable is used if these two values are based on two successive measurements between which no measurement of the same measured variable has failed.

The fusion filter may be designed in such a way that it takes into consideration at least one model assumption, which is based on the fact that the offset values and/or change values and/or correction values and/or error values between one or more function steps of the fusion filter change only to a limited extent or negligibly within the defined time span for which, in particular, absolute values and/or internal values of physical variables are stored.

The invention is based on the concept that, in order to compute the redundant measurement data of various sensors or sensor elements or optionally additionally a satellite navigation system which are measured at different times with one another in a fusion filter and therefore to be able to make use of the advantages of redundancy in sensor fusion, it is advantageous to compute measured variables and/or internal values of the fusion filter which are present, belonging to the same measurement time, in order to keep the error between outdated measurement data which form the input values of the fusion filter and present measurement data namely the values with respect to the measurement data which are present at that time in a pending function step of the fusion filter, as small as possible.

The fusion filter is designed in such a way that the comparison values or internal values of physical variables of the fusion filter are buffer-stored over a certain time or a defined time span, which should in particular cover all of the delay times of all of the input data, and then the appropriate internal value from the past is selected for the comparison for the data fusion and is computed with an input value. Specifically, this can be limited, for example, by the sampling/sample rate/measurement times, and particularly preferably a certain interval remains between internal values of the filter and measurement data. Alternatively, the values are finely interpolated between two sampling operations of the filter to such an extent that a valid measured value appropriate for the time of the measurement data is present. If the internal values from fusion and measurement data or input values, in each case of the same physical variable, are now present at the same time or with substantially the same assigned time information, they can be computed/fusioned with one another easily. Expediently, a comparison of the data from the fusion with those of the measurement data is performed, and from this the corrected values which update the values of the fusion filter are then determined.

The signal processing device may be designed in such a way that all of the input values of the fusion filter are each stored together with the assigned time information for a defined time span and that the absolute values and/or internal values of the preceding function steps of the fusion filter in respect of one or more physical variables are stored together with the respectively assigned time information for a defined time span. It is expedient that the priority of the presently pending function step is defined by the time information of the input value of a physical variable with the most recent time information. Expediently, depending on the time information of the input values, a physical variable, of the fusion filter, these input values are computed in the fusion filter by virtue of them being compared and/or computed with the absolute value and/or internal value of the same physical variable, the time information thereof, i.e. the time information of the absolute value and/or the internal value, substantially corresponding to the time information of the input value. The result of this computation has the priority or relates to the time of the time information which was assigned to the input variable and the absolute value or internal value. On the basis of this result, one or more function steps are implemented by the fusion filter, with which in each case input data and absolute values or internal values which are more recent by one function step are in each case calculated forward in time until the event of the function step is present which has the priority or to which time information is assigned which corresponds to the priority of the function step presently pending at the beginning of this calculation process, which has been defined by the time information of the input value of a physical variable with the most recent time information.

A priority is understood to mean absolute or relative time information or alternatively a position in a temporal sequence, alternatively in particular a combination of the two.

The fusion filter may be in the form of a Kalman filter, alternatively a particle filter or alternatively an information filter or alternatively in the form of an "unscented" Kalman filter.

The fusion filter may be designed in such a way that the fusion data set comprises, as value of the at least one physical variable, a relative value, in particular an offset value and/or change value and/or correction value and/or error value.

It is expedient for the relative values of the respective physical variables of the fusion data set to be correction values, to each of which scattering information or scattering or scattering degree, in particular a variance, is assigned as information relating to the data quality of said correction values.

The fusion filter may be designed in such a way that the value of at least one physical variable of the fusion data set is calculated on a direct or indirect basis from sensor signals from a plurality of sensor elements, wherein these sensor elements detect this at least one physical variable in a direct or indirect manner, with redundancy. This redundant detection is particularly implemented as direct or parallel redundancy and/or as analytical redundancy, from computationally derived or deduced variables/values and/or model assumptions.

The fusion filter may be in the form of a Kalman filter which iteratively implements at least prediction steps and correction steps and at least partially provides the fusion data set. In particular, the fusion filter is in the form of an error state space extended sequential Kalman filter, i.e. in the form of a Kalman filter which particularly comprises linearization and in which error state information is calculated and/or estimated and/or which operates sequentially and in the process uses/takes into consideration the input data available in the respective function step of the sequence.

It is expedient for the sensor system to have an inertial sensor arrangement, comprising at least one acceleration sensor element and at least one rotation rate sensor element, and for the sensor system to comprise a strapdown algorithm unit, in which a strapdown algorithm is implemented, with which at least the sensor signals of the inertial sensor arrangement are processed in particular corrected navigation data and/or driving dynamics data, on the basis of the vehicle in which the sensor system is arranged.

It is particularly preferable for the strapdown algorithm unit to provide its calculated navigation data and/or driving dynamics data to the fusion filter directly or indirectly.

The sensor system may have an inertial sensor arrangement, which is designed in such a way that it can detect at least the acceleration along a second defined axis, in particular the transverse axis of the vehicle, and at least the rotation rate about a third defined axis, in particular the vertical axis of the vehicle, wherein the first and third defined axes form a generating system, and in the process are in particular oriented perpendicular to one another, wherein the sensor system also has at least one wheel rotation speed sensor element, in particular at least or precisely four wheel rotation speed sensor elements, which detect the wheel rotation speed of a wheel or the wheel rotation speeds of in each case one of the wheels of the vehicle and in particular additionally detect the direction of rotation of the assigned wheel of the vehicle in which the sensor system is arranged, wherein the sensor system additionally comprises at least one steering angle sensor element, which detects the steering angle of the vehicle, and wherein the sensor system furthermore comprises a satellite navigation system, which is designed in particular in such a way that it detects and/or provides the distance data in each case between the assigned satellite and the vehicle or a variable dependent thereon and velocity information data in each case between the assigned satellite and the vehicle or a variable dependent thereon.

Particularly preferably, the inertial sensor arrangement is designed in such a way that it can detect at least the accelerations along a first, a second and a third defined axis and at least the rotation rates about these first, second and third defined axes, wherein these first, second and third defined axes form a generating system, and in the process are in particular in each case oriented perpendicular to one another.

It is preferable for the inertial sensor arrangement to provide its sensor signals to the strapdown algorithm unit and for the strapdown algorithm unit to be designed in such a way that it at least calculates and/or provides at least corrected accelerations along the first, the second and the third defined axes, at least corrected rotation rates about these three defined axes, at least a velocity with respect to these three defined axes, and at least one position variable, as measured variables and/or navigation data and/or driving dynamics data from the sensor signals of the inertial sensor arrangement and in particular at least fault state information and/or variance and/or information on the data quality which is assigned to a sensor signal or a physical variable and is provided by the fusion filter.

It is expedient for the sensor system to be designed in such a way that in each case at least one sensor signal and/or a physical variable, as direct or derived variable of the inertial sensor arrangement and/or the strapdown algorithm unit, of the wheel rotation speed sensor elements and the steering angle sensor element, in particular indirectly via a vehicle model unit, and of the satellite navigation system, in this case in particular distance data in each case between the assigned satellite and the vehicle or a variable dependent thereon and velocity information data in each case between the assigned satellite and the vehicle or a variable dependent thereon, are provided to the fusion filter and taken into consideration by the fusion filter in the calculations it performs.

It is particularly preferable for the vehicle model unit to be designed in such a way that the speed along the first defined axis, the speed along the second defined axis and the rotation rate about the third defined axis are calculated from the sensor signals of the rotation speed sensor elements and the steering angle sensor element.

It is very particularly preferable for the vehicle model unit to be designed in such a way that, for the calculation, a least-squared-error method is used for solving an overdetermined system of equations.

It is expedient for the vehicle model unit to be designed in such a way that, in its calculation, it takes into consideration at least the following physical variables and/or parameters a) the steering angle of each wheel, in particular detected by the steering angle sensor for the two front wheels, wherein the model assumption whereby the steering angle of the rear wheels is equal to zero or the steering angle of the rear wheels is additionally detected is used, b) the wheel rotation speed or a variable dependent thereon for each wheel, c) the rotation direction of each wheel, d) the dynamic radius and/or wheel diameter of each wheel, and e) the track width of each axle of the vehicle and/or the wheelbase between the axles of the vehicle.

The signal processing device is preferably designed in such a way that the fusion filter calculates and/or provides and/or outputs the fusion data set at defined times.

The fusion filter is preferably designed in such a way that it calculates and/or provides and/or outputs the fusion data set independently of the sampling rates and/or sensor signal output times of the sensor elements, in particular the wheel rotation speed sensor elements and the steering angle sensor element, and independently of temporal signal or measured variable or information output times of the satellite navigation system.

It is expedient for the signal processing device to be designed in such a way that, over the course of a function step of the fusion filter, the newest information and/or signals and/or data available to the fusion filter of the sensor elements, in particular of the wheel rotation speed sensor elements and the steering angle sensor element, are always updated, in particular asynchronously, directly or indirectly, in particular by means of the vehicle model unit and the satellite navigation system directly or indirectly, sequentially and/or are recorded by the fusion filter and taken into consideration in the calculation of the assigned function step of the fusion filter.

It is preferable for the sensor system to have a standstill identification unit, which is designed in such a way that it can identify a standstill of the vehicle and, in the event of an identified standstill of the vehicle, provides information from a standstill model at least to the fusion filter, in this case in particular the information that the rotation rates about all of the three axes have the value zero and at least one position change variable likewise has the value zero and in particular the velocities along all three axes have the value zero.

It is preferable for the signal processing device to calculate and/or use a first group of data of physical variables, whose values relate to a vehicle coordinate system, and wherein the signal processing device additionally calculates and/or uses a second group of data of physical variables, whose values relate to a world coordinate system, wherein this world coordinate system is suitable in particular at least for describing the orientation and/or dynamic variables of the vehicle in the world, wherein the sensor system has an orientation model unit, with which the orientation angle between the vehicle coordinate system and the world coordinate system is calculated, wherein the orientation angle between the vehicle coordinate system and the world coordinate system is calculated in the orientation model unit at least on the basis of the following variables: the velocity with respect to the vehicle coordinate system, the velocity with respect to the world coordinate system and in particular the steering angles.

It is expedient for the following terms to be used synonymously, i.e. have the same meaning when implemented technically: offset value, change value, correction value and error value.

Error state information is preferably understood to mean error information and/or error correction information and/or scattering information and/or variance information and/or accuracy information.

The term variance is preferably understood to mean scatter, wherein in particular in the case of a general fusion filter, said filter in each case assigns scatter or a scatter value to each value of a physical variable of the fusion filter, and in the case of a Kalman filter as the fusion filter, in each case a variance is assigned to each value of a physical variable of the fusion filter.

It is expedient for the first, second and third defined axes on the basis of a coordinate system of the vehicle in which the sensor system is implemented to be defined as follows: the first defined axis corresponds to the longitudinal axis of the vehicle, the second defined axis corresponds to the transverse axis of the vehicle, and the third defined axis corresponds to the vertical axis of the vehicle. These three axes in particular form a Cartesian coordinate system.

It is preferable for the fusion filter to be designed in such a way that its data, in particular the physical variables or the data of the physical variables of the fusion data set, are divided into blocks which always have a constant size and which are processed iteratively in any desired order in the fusion filter, i.e. the fusion filter implements a sequential update with respect to its input data. In this case, the fusion filter is particularly preferably designed in such a way that the filter equations are matched, with the result that the computational result of the sequential update in each step of the fusion filter is an update, i.e. a data update, for all measured variables of the input data of the fusion filter.

The sensor system is expediently arranged in a vehicle, in particular in a motor vehicle, particularly preferably in an automobile.

The sensor system is preferably designed in such a way that data of the satellite navigation system, in particular position data, are assigned timestamp information, which substantially describes the measurement time of these data. The timestamp information of the respective datum of the satellite navigation system is provided jointly with this respective datum to the fusion filter and taken into consideration in the internal calculation in the fusion filter.

Preferably, in addition, such timestamp information is likewise assigned to the data of further or all of the sensor elements and/or the inertial sensor arrangement, which timestamp information is likewise provided with the respective datum to the fusion filter and is taken into consideration in the internal calculation in the fusion filter. Expediently, the respective timestamp information is generated by the satellite navigation system itself with respect to the data of the satellite navigation system.

It is preferable for the respective timestamp information to be generated by the signal processing device in the case of the additional timestamp information of the further sensor elements and/or the inertial sensor arrangement, in particular depending on the time measurement of the satellite navigation system.

Preferably, a function step of the fusion filter comprises at least one prediction step and a correction step. The fusion filter is in this case formed iteratively and performs iteratively, one after the other, function steps. In particular, data or values or signals are input within each function step of the fusion filter, i.e. input data are taken into consideration, i.e. data or values or signals are also output, i.e. provided as output data.

The fusion filter is preferably designed in such a way that the fusion filter implements a plurality of update steps within a function step, wherein these update steps relate to loading or use or updating of input data or signals. The fusion filter runs in particular sequentially through all of the input variables or input signals and checks in each case whether new information/data are present. If this is the case, this information or data is transferred into the filter or the information/data are updated in the filter, and if this is not the case the present value is maintained and the filter checks the next input or the next input variable or the next input signal.

The strapdown algorithm unit preferably provides at least absolute values of physical variables, in particular absolute values for the acceleration, the rotation rate, the velocity, in this case in each case in relation to the three axes, to the vehicle and/or world coordinate system, and a position and the orientation angle. The values with respect to these variables are in this case particularly preferably all provided by the strapdown algorithm unit as corrected values/variables.

It is expedient for the inertial sensor arrangement to clock and/or trigger the fusion filter, in particular each fusion step which is implemented by the fusion filter is triggered by the inertial sensor arrangement or at least one output signal or output datum.

It is preferable for the strapdown algorithm unit to be designed in such a way that it has a start vector of physical variables and/or a start value of the position, in particular with respect to the start of the sensor system, particularly preferably after each time the sensor system is switched on. The strapdown algorithm unit particularly preferably receives this start vector and/or this start position via the fusion filter from the satellite navigation system.

It is expedient for the data of the fusion filter, in particular the fusion data set thereof, to image a virtual sensor or correspond to such a virtual sensor.

The term sensor elements is preferably understood to mean the wheel rotation speed sensor elements, the at least one steering angle sensor element, the sensor elements of the inertial sensor arrangement and in particular additionally also the satellite navigation system.

If, in general, a variable and/or value is specified in respect of the three defined axes, it is preferable for this to be intended with respect to the vehicle coordinate system and/or the world coordinate system.

It is expedient for the fusion data set, which comprises values of the physical variables, to comprise a relative value, for example a correction value, also referred to as offset value, and in particular to be provided to the strapdown algorithm unit. In accordance with the example, this respective correction value results in each case from the accumulated error values or change values which are provided by the fusion filter.

In addition, the invention relates to the use of the sensor system in vehicles, in particular motor vehicles, particularly preferably in automobiles.

BRIEF DESCRIPTION OF THE DRAWING

FIG. 1 illustrates a block diagram of the sensor system.

FURTHER DESCRIPTION OF THE INVENTION

FIG. 1 shows a schematic illustration of an exemplary embodiment of the sensor system, which is intended for arrangement and use in a vehicle. In this case, the sensor elements and the satellite navigation system as well as the most important signal processing units of the signal processing device are illustrated as function blocks and the interaction of said blocks with one another is also illustrated.

The sensor system comprises an inertial sensor arrangement 1, IMU, "inertial measurement unit", which is designed in such a way that it can detect at least the accelerations along a first, a second and a third defined axis and at least the rotation rates about these first, second and third defined axes, wherein the first defined axis corresponds to the longitudinal axis of the vehicle, the second defined axis corresponds to the transverse axis of the vehicle, and the third defined axis corresponds to the vertical axis of the vehicle. These three axes form a Cartesian coordinate system, the vehicle coordinate system.

The sensor system has a strapdown algorithm unit 2, in which a strapdown algorithm is implemented, with which at least the sensor signals of the inertial sensor arrangement 1 are processed to give corrected navigation data and/or driving dynamics data. These output data of the strapdown algorithm unit 2 include the data of the following physical variables: the velocity, the acceleration and the rotation rate in each case of the vehicle, by way of example with respect to the three axes of the vehicle coordinate system and, in accordance with the example, additionally in each case in relation to a world coordinate system, which is suitable for describing the orientation and/or dynamic variables of the vehicle in the world. In addition, the output data of the strapdown algorithm unit 2 comprise the position with respect to the vehicle coordinate system and the orientation with respect to the world coordinate system. In addition, the output data of the strapdown algorithm unit have the variances as information on the data quality of the abovementioned physical variables, at least some of said variables. These variances, in accordance with the example, are not calculated in the strapdown algorithm unit, but are only used and passed on by said strapdown algorithm unit.

The output data of the strapdown algorithm unit are additionally, by way of example, the output data or signals 12 of the entire sensor system.

The sensor system additionally comprises wheel rotation speed sensor elements 3 for each wheel of the vehicle, in accordance with the example four, which detect the wheel rotation speeds of in each case one of the wheels of the vehicle and in each case additionally detect the direction of rotation, and additionally a steering angle sensor element 3, which detects the steering angle of the vehicle. The wheel rotation speed sensor element and the steering angle sensor element form a sensor arrangement 3 for odometry detection.

Furthermore, the sensor system has a satellite navigation system 4, which is designed in such a way that it detects and/or provides the distance data in each case between the assigned satellite and the vehicle or a variable dependent thereon and velocity information data in each case between the assigned satellite and the vehicle or a variable dependent thereon. In addition, the satellite navigation system 4, in accordance with the example, provides a start position or start position information, at least for starting or switching on the sensor system, to the fusion filter.

The signal processing device of the sensor system also comprises a fusion filter 5. The fusion filter 5 provides a defined fusion data set 6 over the course of the joint evaluation of at least the sensor signals and/or signals derived therefrom of the sensor elements 3, i.e. the odometry, and the output signals of the satellite navigation system 4 and/or signals derived therefrom. This fusion data set has in each case data with respect to defined physical variables, wherein the fusion data set 6 with respect to at least one physical variable comprises a value of this physical variable and information on its data quality, wherein this information on the data quality is expressed as variance, in accordance with the example.

The fusion data set 6 comprises, as value of the at least one physical variable, a relative value, for example a correction value, also referred to as offset value. In accordance with the example, the correction value results in each case from the accumulated error values or change values which are provided by the fusion filter 5.

The relative values of the respective physical variables of the fusion data set 6 are therefore correction values and variances, in accordance with the example. In other words, the fusion data set 6, in accordance with the example, calculates an error budget, which is provided as input variable or input data set to the strapdown algorithm unit and is taken into consideration at least partially by said strapdown algorithm unit in its calculations. This error budget comprises, as data set or output data, at least correction values or error values of physical variables and in each case a variance, as information on the data quality, with respect to each value. In this case, at least the correction values and variances with respect to the physical variables velocity, acceleration and rotation rate, in each case in relation to the vehicle coordinate system, i.e. in each case the three components of these variables with respect to this coordinate system, and IMU orientation or the IMU orientation angle between the vehicle coordinate system and the coordinate system or the installation orientation of the inertial sensor arrangement 1 and the position in relation to the world coordinate system are transmitted by the fusion filter to the strapdown algorithm unit.

The values of the physical variables of the fusion data set are calculated on a direct or indirect basis of the sensor signals of the sensor elements 3 and the satellite navigation system 4, wherein at least some variables, for example the velocity and the position of the vehicle with respect to the vehicle coordinates, are detected and used with redundancy with respect to the data of the strapdown algorithm unit 2.

The fusion filter 5 is, in accordance with the example, in the form of an error state space extended sequential Kalman filter, i.e. in the form of a Kalman filter which comprises in particular linearization and in which the correction values are calculated and/or estimated and which operates sequentially and in the process uses/takes into consideration the input data available in the respective function step of the sequence.

The fusion filter 5 is designed in such a way that, over the course of a function step of the fusion filter, the newest information and/or signals and/or data available to the fusion filter of the sensor elements 3, i.e. the wheel rotation speed sensor elements and the steering angle sensor element indirectly by means of a vehicle model unit 7 and of the satellite navigation system 4 directly or indirectly are always sequentially updated, asynchronously, and/or recorded in the fusion filter and taken into consideration in the calculation of the assigned function step of the fusion filter 5.

The vehicle model unit 7 is designed in such a way that it calculates, from the sensor signals of the wheel rotation speed sensor elements 3 and the steering angle sensor element 3, at least the velocity along a first defined axis, the velocity along a second defined axis, and the rotation rate about a third defined axis and provides these to the fusion filter 5.

The sensor system has, in accordance with the example, four wheel rotation speed sensor elements 3, wherein in each case one of the wheel rotation speed sensor elements is assigned to each wheel of the vehicle, wherein the vehicle model unit 7 is designed in such a way that it calculates, from the sensor signals of the wheel rotation speed sensor elements and the steering angle, provided by the steering angle sensor unit, and/or the steering angle of each wheel, in particular detected by the steering angle sensor element for the front wheels and by means of at least one further steering angle sensor element for the rear wheels or at least from a model assumption for the rear wheels, the velocity components and/or the velocity of each wheel, along/with respect to the first and second defined axes directly or indirectly, wherein, from these eight velocity components and/or the four velocities, in each case with respect to the first and second defined axes, the velocity along a first defined axis, the velocity along a second defined axis, and the rotation rate about a third defined axis are calculated.

The sensor system or the signal processing device of said sensor system also comprises a tire parameter estimation unit 10, which is designed in such a way that it calculates at least the radius, in accordance with the example the dynamic radius, of each wheel and additionally calculates the cornering stiffness and the slip stiffness of each wheel and provides these to the vehicle model unit 7 as additional input variables, wherein the tire parameter estimation unit 10 is designed in such a way that it uses a substantially linear tire model for calculating the wheel/tire variables. The input variables of the tire parameter estimation unit in accordance with the example are in this case the wheel rotation speeds 3 and the steering angle 3, at least partially or completely the output variables or values of the strapdown algorithm unit 2, in particular the variances provided thereby in addition to the values of the physical variables, and the variances of the fusion filter 5, with respect to the physical variables which are the input variables of the tire parameter estimation unit 10.

The sensor system or its signal processing device also comprises a GPS error identification and plausibilization unit 11, which is designed in such a way that, in accordance with the example, it receives, as input data, the output data or output signals of the satellite navigation system 4 and at least partially the output data or output signals of the strapdown algorithm unit 2 and takes these into consideration in its calculations.

In this case, the GPS error identification and plausibilization unit 11 is additionally connected to the fusion filter 5 and exchanges data therewith.

The GPS error identification and plausibilization unit 11 is designed, by way of example, in such a way that it implements the following method:

Method for electing a satellite, comprising:

measuring measurement position data of the vehicle with respect to the satellite on the basis of the GNSS signal, i.e. the global navigation satellite system signal, the output signal or the output data of the satellite navigation system 4, determining reference position data of the vehicle which are redundant with respect to the measurement position data determined on the basis of the GNSS signal; and selecting the satellite when a comparison of the measurement position data and the reference position data satisfies a predetermined condition, wherein, in order to compare the measurement position data and the reference position data, a difference between the measurement position data and the reference position data is formed, wherein the predetermined condition is a maximum permissible error between the measurement position data and the reference position data, wherein the maximum permissible error is dependent on a standard deviation, which is calculated on the basis of a sum of a reference variance for the reference position data and a measurement variance for the measurement position data, wherein the maximum permissible error corresponds to a multiple of the standard deviation such that a probability that the measurement position data fall below a predetermined threshold value in a scatter interval which is dependent on the standard deviation.

The sensor system or its signal processing device also has a standstill identification unit 8, which is designed in such a way that it can identify a standstill of the vehicle and, in the event of an identified standstill of the vehicle, provides information from a standstill model at least to the fusion filter 5, in this case in particular the information that the rotation rates about all three axes have the value zero and at least one position change variable likewise has the value zero and in particular the velocities along all three axes have the value zero. The standstill identification unit 8 is in this case designed, in accordance with the example, in such a way that it uses the wheel rotation speeds or wheel rotation speed signals as input data and the "raw" or direct output signals of the inertial sensor arrangement 1.

The signal processing device calculates and/or uses, in accordance with the example, a first group of data of physical variables, whose values relate to a vehicle coordinate system and in addition calculates and/or uses a second group of data of physical variables, whose values relate to a world coordinate system, wherein this world coordinate system is suitable in particular at least for describing the orientation and/or dynamic variables of the vehicle in the world, wherein the sensor system has an orientation model unit 9, with which the orientation angle between the vehicle coordinate system and the world coordinate system is calculated.

The orientation angle between the vehicle coordinate system and the world coordinate system in the orientation model unit 9 is calculated at least on the basis of the following variables: the velocity with respect to the vehicle coordinate system, the velocity with respect to the world coordinate system and the steering angle.

The orientation angle between the vehicle coordinate system and the world coordinate system is calculated, in accordance with the example, in the orientation model unit 9 additionally at least on the basis of one or more of the following variables: orientation information of the vehicle based on the world coordinate system, some or all of the correction values and/or variances of the fusion filter and/or the acceleration of the vehicle in relation to the vehicle coordinate system and/or the world coordinate system.

The orientation model unit 9 uses some or all of the output data and/or output signals of the strapdown algorithm unit 2 for the calculation.

The orientation model unit 9 is designed, in accordance with the example, in such a way that it calculates and provides, in addition to the orientation angle, also information on the data quality of this variable, in particular the variance of the orientation angle, wherein the orientation model unit 9 provides the orientation angle between the vehicle coordinate system and the world coordinate system and the information on the data quality of this variable to the fusion filter 5, and the fusion filter uses this orientation angle in its calculations and particularly preferably passes on the information on the data quality of this variable, in particular the variance of the orientation angle, to the strapdown algorithm unit 2.

While the above description constitutes the preferred embodiment of the present invention, it will be appreciated that the invention is susceptible to modification, variation, and change without departing from the proper scope and fair meaning of the accompanying claims.

The invention claimed is:

1. A sensor system, the sensor system comprising:
a plurality of sensor elements configured to measure physical variables and output sensor signals comprising measurement data representing the physical variables measured;
a signal processing device in communication with the plurality of sensor elements;
wherein the signal processing device is configured to evaluate each of the sensor signals from the sensor elements during a time period;
wherein the signal processing device is configured to assign time information, which comprises information on the time of the respective measurement, to the measured physical variables;
wherein the signal processing device is configured to take into consideration time information at least during the generation of a fusion data set in a fusion filter;
wherein the signal processing device is configured to determine a defined time span, the defined time span defined by a maximum delay of the input data of the fusion filter, the maximum delay being determined from a maximum difference between the time information of the measured physical variables and the time information of a presently pending function step of the fusion filter, wherein the maximum delay is further defined as being greater than or equal to the maximum expected delay of a measurement of a satellite navigation system which is part of the sensor system;
the measurement data comprising measured physical variables, the measured physical variables each having offset values and/or change values and/or correction values and/or error values, associated with each of the measured physical variables; and
wherein the fusion filter is configured to take into consideration at least one model assumption of the measured physical variables, wherein the at least one model assumption assumes that offset values and/or change values and/or correction values and/or error values, associated with each of the physcial variables, between one or more function steps of the fusion filter are substantially unchanged within the defined time span for which absolute values and/or internal values of the physical variables are stored.

2. The sensor system as claimed in claim 1, wherein the fusion filter is configured to:
implement successively, each function step being assigned time information,
provide fusion data sets which each provide a relative value of the physical variable and information on the data quality in respect of each physical variable which is processed and/or calculated by the fusion filter.

3. The sensor system as claimed in claim 1 wherein the fusion filter has an absolute value and/or internal value of this physical variable, wherein the absolute values and/or internal values of the one or more function steps with respect to one or more physical variables are stored for a defined time period.

4. The sensor system as claimed in claim 3, wherein the fusion filter is configured to:
compare time information input values with the absolute value and/or internal value of a same physical variable, the time information corresponds to the time information input values.

5. The sensor system as claimed in claim 1, wherein the signal processing device is further configured to:
assign time information to each of the input values of the fusion filter,
assign a priority to each of the physical variables,
compute the input values of physical variables of the fusion filter with internal values of the fusion filter of the same physical variables, which correspond in terms of priority and/or with regard to the time information to the respective time information and/or the priority of the respective input variable.

6. The sensor system as claimed in claim 1 wherein the signal processing device is configured to define the priority of the presently pending function step by the time information of the input value of a physical variable with the most recent time information, wherein the input values of physical variables whose time information is older are extrapolated onto the priority of the most recent time information and then computed with internal values of the fusion filter.

7. The sensor system of claim 1, wherein the signal processing device is configured to define a defined time span by a defined time span which is different for some or each physical variable.

8. The sensor system as claimed in claim 1, the sensor system further comprising a satellite navigation system, which provides a synchronization pulse to synchronize the time information of the fusion filter with the time information of the satellite navigation system.

9. The sensor system as claimed in claim 8, wherein the satellite navigation system is configured to provide distance data in each case between an assigned satellite and a vehicle or a variable which is dependent thereon and velocity information data between the assigned satellite and the vehicle or a variable dependent thereon, wherein these input values of physical variables of the satellite navigation system are computed, in time-corrected fashion, with internal values of the fusion filter by virtue of the internal values of these physical variables being extrapolated if the time information of the input values of these physical variables are older than time information of the presently pending function step of the fusion filter, wherein, for the extrapolation, in particular a gradient of the last two values of such a physical variable is used if these two values are based on two successive measurements between which no measurement of the same measured variable has failed.

* * * * *